Figure 1:
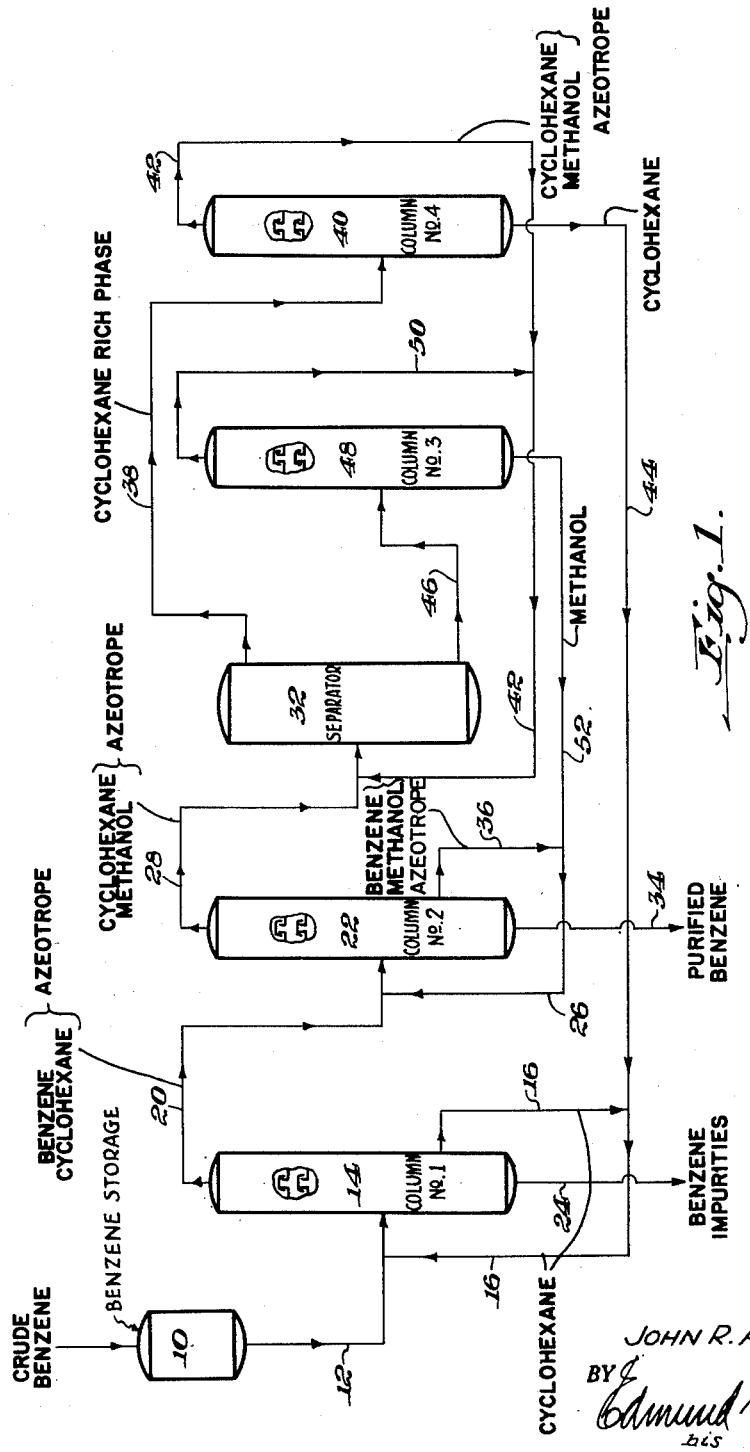

INVENTOR.
JOHN R. ANDERSON
BY
his ATTORNEY.

Patented Nov. 18, 1952

2,618,591

UNITED STATES PATENT OFFICE 2,618,591

PURIFICATION OF DISTILLED COKE OVEN BENZENE BY DISTILLATION WITH ADDED HYDROCARBON MATERIAL

John R. Anderson, Pittsburgh, Pa., assignor to Koppers Company, Inc., Pittsburgh, Pa., a corporation of Delaware Application October 12, 1948, Serial No. 54,086

6 Claims. (Cl. 202—42)

This invention relates to the purification of aromatic hyrocarbons. More particularly the invention relates to an improved method for the purification of aromatic hydrocarbons by a 2-stage distillation having a different azeotropic agent for each stage distillation and in which the azeotropic agents may be readily separated and recycled in the method without recourse to water extraction procedures.

In my copending application Ser. No. 31,098 filed June 4, 1948, now Patent No. 2,581,344, granted January 8, 1952 is disclosed a 2-stage distillation method of refining aromatic hydrocarbons in which a specially adapted non-aromatic hydrocarbon is used in the first distillation to form an azeotrope with the aromatic hydrocarbon so that the azeotrope is carried overhead as a distillate to separate the aromatic hydrocarbon from its impurities. Thereafter the azeotrope distillate is distilled with a polar azeotropic agent to take overhead an azeotropic mixture of the polar and non-aromatic azeotropic agents and to recover the aromatic hydrocarbon as a bottom fraction. The azeotropic mixture of the two azeotropic agents is then separated by water extraction and decantation. The non-aromatic hydrocarbon is recycled in the method and the diluted polar azeotropic agent is distilled to separate the agent from the water so that both may be recycled in the method. An important feature in the above mentioned method consists in employing a non-aromatic hydrocarbon azeotropic agent to separate the aromatic hydrocarbon from its impurities.

It is a common practice to separate a water-soluble azeotropic agent from hydrocarbons by water extraction and decantation and then to separate the azeotropic agent from the resulting water solutions by distillation. This method of recovery, however, has the disadvantage that relatively large volumes of water are required for the extraction, and the distillation of the water solutions becomes an expensive operation because of the large heating requirements.

Numerous experiments have shown that the advantages of the above-mentioned 2-stage distillation method for the purification of aromatic hydrocarbons may be obtained without the expensive use of water extraction and distillation if the non-aromatic hydrocarbon azeotropic agent for the first distillation and the polar azeotropic agent for the second distillation are properly chosen. For example it has been found that if in the purification of benzene, cyclohexane is used in the first stage distillation and methanol is used in the second stage distillation, then the azeotropic mixture of these azeotropic agents which is obtained in the second stage distillation may be separated in condition for recycling without resorting to water extraction.

Cyclohexane and methanol are not miscible in all proportions at temperatures below 45° C. At a higher temperature cyclohexane and methanol form an azeotrope of such composition that two phases are formed when the azeotrope is cooled to room temperature (20 to 30° C.) or below. Each of these phases may be distilled to produce an overhead product which consists of cyclohexane-methanol azeotrope leaving on the one hand cyclohexane and on the other hand methanol as distilland. The azeotrope obtained by the distillation of the two phases will also separate into two phases at room temperature and hence it is possible to separate the cyclohexane-methanol azeotrope into its two components by alternate use of distillation, at a temperature higher than room temperature, and phase separation and decantation at room temperature. Numerous experiments have revealed, however, that it is also possible to employ as azeotropic agents, in the above-mentioned 2-stage process, the phases which separate when the azeotropic distillate, which is obtained in the second stage distillation, is cooled to room temperature.

The primary object of the present invention is to provide a method of purifying aromatic hydrocarbons in a 2-stage distillation process employing an azeotropic agent for each distillation by which the azeotropic agents may be inexpensively separated and recycled in the method.

A further object of the invention is to provide a method of purifying aromatic hydrocarbons in a 2-stage distillation process employing an azeotropic agent for each distillation by which the azeotropic agents may be inexpensively separated by phase separation in order to be recycled in the method.

Another object of the invention is to provide a method of purifying aromatic hydrocarbons by a 2-stage azeotropic distillation method employing a non-aromatic hydrocarbon agent for the first distillation and a polar agent for the second distillation, and separating the two azeotropic agents for recycling in the method without the use of water extraction.

With these aid other objects in view, the invention consists in the improved method for the recovery of azeotropic agents which are employed in a 2-stage distillation method for purifying aromatic hydrocarbons as hereinafter described and particularly defined in the claims.

Figure 2:
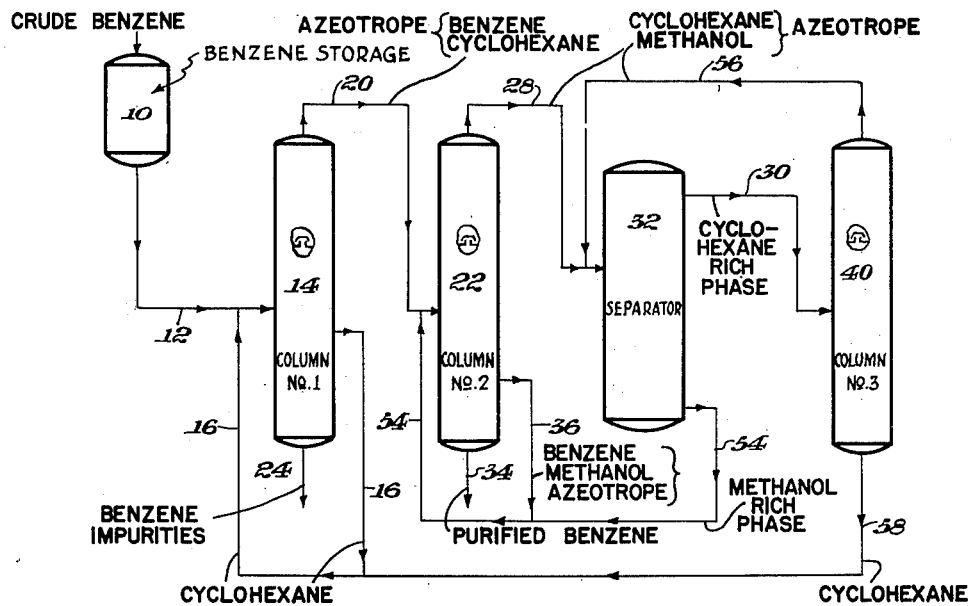
Figure 3:
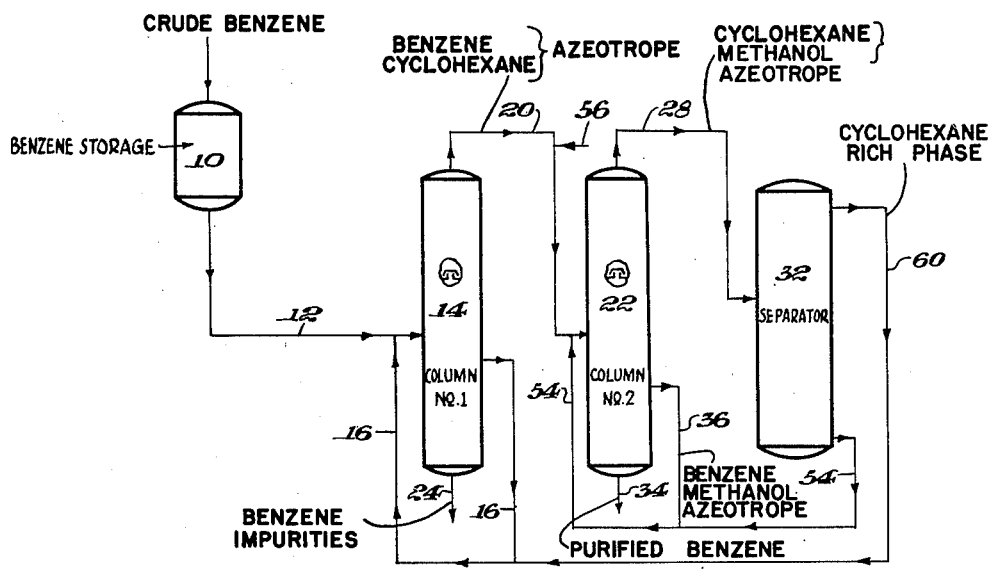

The various features of the invention are illustrated in the accompanying drawings in which Figure 1 is a diagrammatic flow sheet of an apparatus in which a 2-stage distillation purification of aromatic hydrocarbons may be carried out with a phase separation of the azeotropic mixture of azeotropic agents and the separation of the azeotropic agents by distillation;

Figure 2 is a diagrammatic flow sheet of a 2- stage distillation purification of aromatic hydrocarbons in which the azeotropic mixture of azeotropic agents is phase separated and the upper phase distilled to recover the azeotropic agent used in the first distillation stage while the lower phase is returned directly to the second distillation stage; and Figure 3 is a diagrammatic flow sheet of an apparatus in which the preferred form of the method of purifying aromatic hydrocarbons in a 2-stage distillation may be carried out, the method involving a phase separation of the azeotropic mixture of azeotropic agents used in each of the stages and the phases themselves being recycled directly to the respective distillation stages.

The preferred method of the present invention will be described with reference to the purification of nitration grade benzene which has previously been distilled and treated with sulphuric acid to remove sulphur impurities. The present method is well adapted for preparing benzene and other aromatic hydrocarbons in high purity, that is 99.9+% purity.

Referring to Figure 1 impure benzene is taken from reservoir 10 and passed through a line 12 into first distillation tower 14. Cyclohexane is introduced into the impure benzene through a line 16 to form an azeotrope with the benzene. The benzene-cyclohexane azeotrope is taken overhead from the tower 14 through line 20 and passed into the mid-portion of the second distillation tower 22. The impurities in the benzene are removed from the base of the still 14 through the line 24. The excess cyclohexane over that required to form the cyclohexane-benzene azeotrope is taken out near the lower portion of the column 14 through the line 18 and returned to the feed line 12. Methanol is introduced into the feed line 20 through a line 26 to form an azeotrope with cyclohexane. In the column 22 a cyclohexane-methanol azeotrope is taken overhead through a line 28 and passes into the mid-portion of a decanting separator 32. Pure benzene is removed from the bottom of the column 22 through a line 34. A benzene-methanol azeotrope cut is taken near the bottom of the column 22 through a line 36 and is recycled back to the line 26 for introduction into the column 22. The cyclohexane-methanol azeotrope in the decanter 32 is cooled to a temperature below 30° C. preferably room temperature to effect a separation due to the immiscibility of the system. Temperatures down to the crystallization of a component of the azeotrope may be used for phase separation but operation at atmospheric temperatures is more economic. A supernatant liquid comprising from 90% to 96% cyclohexane and 10% to 4% methanol passes overhead through a line 38 to the mid-portion of a column 40. In the column 40, a cyclohexane-methanol azeotrope is taken overhead through a line 42 and is recycled through the line back to the line 28 by which the cyclohexane-methanol azeotrope is introduced into the decanter 32. Cyclohexane in substantially pure form is removed from the bottom of the column 40 through a line 44 and is returned to the line 16 for introduction to the feed of the first distillation column. The heavy methanol solution settling in the decanter 32 is removed through a line 46 and introduced into the mid-portion of a column 48. The cyclohexane-methanol azeotrope passes overhead through a line 50 and flows into line 42 by which it is mixed with the cyclohexane-methanol azeotrope flowing through the line 28. Methanol in substantially pure form is removed from the bottom of the column 48 through a line 52 by which it is introduced into the line 26 for recirculation back to the second distillation column 22.

With the apparatus illustrated in Figure 1, the cyclohexane-methanol azeotrope is resolved into its component parts and recycled back to the first and second distillation columns without the addition of water. Although two columns are used for separating the components of the cyclohexane-methanol azeotrope nevertheless the heat requirements for the distillation are comparatively low.

In Figure 2 is illustrated an apparatus by which a single decanting separator and a single column are used for substantially resolving the cyclohexane-methanol azeotrope into its component parts so that they may be returned to the first and second distilling columns for recycling therein. Referring to the drawing, crude benzene is taken from container 10 and passed through line 12 to column 14. The benzene-cyclohexane azeotrope passes overhead through line 20 and the high boiling hydrocarbon impurities are removed from the bottom of the column through line 24. A cyclohexane side cut is removed through line 16 for recycling back to the line 12 to reintroduce an excess of cyclohexane over that required to azeotrope with all of the benzene into the column 14. A mixture of methanol containing some cyclohexane is introduced into the line 20 through a line 54 for producing the cyclohexane-methanol azeotrope to separate the cyclohexane from the benzene. This mixture of the methanol-containing cyclohexane and benzene-cyclohexane azeotrope is introduced into the mid-portion of column 22. A cyclohexane-methanol azeotrope passes overhead from the column 22 through a line 28 and pure benzene is removed from the bottom of the column 22 through line 34. A benzene-methanol azeotrope is taken as a side cut from the column 22 through the line 36 and recycled back to the line 54. The cyclohexane-methanol azeotrope passes through line 28 into the mid-portion of a decanting separator 32 where it is cooled to a temperature below 30° C., preferably room temperature, to allow the solution to separate into two layers. Supernatant liquid composed principally of cyclohexane (90% to 96% cyclohexane and 10% to 4% methanol) passes through line 30 into the mid-portion of a column 40 where it is distilled. A cyclohexane-methanol azeotrope passes overhead through a line 56 and is introduced into the line 28 with the liquid passing into the mid-portion of the decanter. Substantially pure cyclohexane flows out of the bottom of column 40 and passes through line 58 where it is introduced finally into line 12. The heavier methanol enriched liquid settling to the bottom of the decanter 32 is removed through the line 54 for recirculation back to the line 20 to serve for the formation of the cyclohexane-methanol azeotrope in the second distillation column. This mixture may be effectively used as an azeotropic agent for forming the cyclohexane-methanol azeotrope in the second column and thus avoids the necessity of using a separate distillation column for separating the cyclohexane from the methanol in the solution removed from the bottom of the decanter.

In Figure 3 is illustrated an apparatus by which benzene may be separated from its impurities in a 2-stage distillation using a non-aromatic azeotropic agent in the first distillation and methanol in the second distillation. Further the cyclohexane-methanol azeotrope recovered in the second distillation may be effectively separated by phase separation involving cooling so that the two azeotropic agents may be recycled directly from the phase separation back to their respective distillation columns and thus recover pure benzene without any water or any distillation being used for separating the cyclohexane-methanol azeotrope. In Figure 3 crude benzene is taken from reservoir 10, passed through a line 12 into a first distillation tower 14. A mixture of cyclohexane and methanol is introduced into the line 12 through a line 16 to form the azeotropic agent for distillation in the column 14. A benzene-cyclohexane azeotrope together with a small amount of cyclohexane-methanol azeotrope is taken overhead through a line 20 and passes to the mid-portion of the second distillation column 22. Hydrocarbon impurities are removed from the bottom of the column 14 through line 24. A mixture of methanol and cyclohexane is introduced into the line 20 through a line 54 to form an azeotropic agent for separating cyclohexane from the benzene-cyclohexane azeotrope introduced through the line 20. In the distillation a cyclohexane-methanol azeotrope passes overhead through the line 28 into the mid-portion of a decanter 32. Pure benzene is removed from the bottom of column 22 through line 34. In the decanter 32 the cyclohexane-methanol azeotrope is cooled to a temperature below 30° C., preferably room temperature to effect a phase separation of the cyclohexane and methanol. The solution settles so that the supernatant solution composed of 90 to 96% cyclohexane and 10 to 4% methanol passes out of the top of the decanter through a line 60 back to the line 16 and a heavy solution composed of 62% to 68% methanol and 38% to 32% cyclohexane passes out through a line 54 to the line 20. To assist in carrying on the distillation in column 22, a side cut of benzene-methanol azeotrope is taken off of the lower portion of the column 22 through the line 36, and introduced into the line 54.

By this operation pure benzene is separated from its impurities with a 2-stage azeotropic distillation and a phase decanting separation of the azeotrope formed in the second distillation. The resolution of the azeotrope formed in the second distillation into a preponderantly cyclohexane cut and a preponderantly methanol cut provides for the formation of effective azeotropic agents which do not need to be further separated or purified by distillation.

In the continuous processes illustrated in Figures 1 to 3, azeotropic agents, such as cyclohexane, and methanol, are added to the benzene mixture being continuously distilled and these azeotropic agents are then recovered and returned to their respective stages in the process. It is to be understood that a portion of these azeotropic agents might be lost in the operation, and, therefore, it is necessary to add to the various stages the azeotropic agents to maintain the desired volume of azeotropic agents for carrying on the separation operations.

It is also to be understood that when the process is first put into use cyclohexane must be introduced with the benzene (from storage) and methanol must be introduced into column 22, for example through line 56.

Further it is to be understood that some benzene may accompany the cyclohexane-methanol azeotrope as that azeotrope leaves column 22 through line 28. This will not result in a loss of benzene from the system due to the recycling of the components of the azeotropes back to the distillation columns 14 and 22.

The preferred form of the invention having been thus described, what is claimed as new is:

1. In a process for the purification of distilled coke-oven benzene which contains a small amount of non-aromatic hydrocarbon impurities higher boiling than benzene and substantially inseparable therefrom by simple distillation wherein said benzene is distilled in a fractional distillation zone admixed with added non-aromatic hydrocarbon material, said hydrocarbon material boiling normally between 75° and 85° C. and being added in an amount in excess of that required to form an azeotrope with said benzene, wherein an azeotrope of benzene and said added hydrocarbon material is removed from said distillation zone as an overhead fraction, and wherein the high boiling impurities and at least a portion of the excess added hydrocarbon material are removed from the distillation zone as a distillation residue; the improvement which comprises distilling said azeotrope of benzene and said added hydrocarbon material in a second fractional distillation zone in the presence of an azeotropic agent comprising predominantly methanol, removing from said second distillation zone purified benzene as a distillation residue, removing from said second distillation zone an azeotrope of said added hydrocarbon material and methanol as an overhead fraction, separating the overhead fraction from said second distillation zone into a methanol-rich phase and an added hydrocarbon-rich phase solely by cooling, passing said methanol-rich phase directly to said second distillation zone as at least a portion of the azeotropic agent employed therein, distilling said hydrocarbon-rich phase in a third fractional distillation zone to yield substantially pure hydrocarbon material, and passing said hydrocarbon material to the first mentioned distillation zone as at least a portion of the hydrocarbon material added to said benzene to form an azeotrope.

2. In a process for the purification of distilled coke-oven benzene which contains a small amount of non-aromatic hydrocarbon impurities higher boiling than benzene and substantially inseparable therefrom by simple distillation wherein said benzene is distilled in a fractional distillation zone admixed with added non-aromatic hydrocarbon material, said hydrocarbon material boiling normally between 75° and 85° C. and being added in an amount in excess of that required to form an azeotrope with said benzene, wherein an azeotrope of benzene and said added hydrocarbon material is removed from said distillation zone as an overhead fraction, and wherein the high boiling impurities and at least a portion of the excess added hydrocarbon material are removed from the distillation zone as a distillation residue; the improvement which comprises distilling said azeotrope of benzene and said added hydrocarbon material in a second fractional distillation zone in the presence of an azeotropic agent comprising predominantly methanol, removing from said second distillation zone purified benzene as a distillation residue, removing from said second distillation zone an azeotrope of said added hydrocarbon material and methanol as an overhead fraction, separating the overhead fraction from said second distillation zone into a methanol-rich phase and an added hydrocarbon-rich phase solely by cooling, passing said methanol-rich phase directly to said second distillation zone as at least a portion of the azeotropic agent employed therein, and passing said hydrocarbon-rich phase directly to the first mentioned distillation zone as at least a portion of the added hydrocarbon material added to said benzene to form an azeotrope.

3. In a process for the purification of distilled coke-oven benzene which contains a small amount of non-aromatic hydrocarbon impurities higher boiling than benzene and substantially inseparable therefrom by simple distillation wherein said benzene is distilled in a fractional distillation zone with added cyclohexane admixed in an amount in excess of that required to form an azeotrope with said benzene, wherein the azeotrope of benzene and cyclohexane is removed from said distillation zone as an overhead fraction, and wherein the high boiling impurities and at least a portion of the excess cyclohexane are removed from the distillation zone as a distillation residue, the improvement which comprises distilling said azeotrope of benzene and cyclohexane in a second fractional distillation zone in the presence of an azeotropic agent comprising predominantly methanol, removing from said second distillation zone purified benzene as a distillation residue, removing from said second distillation zone the azeotrope of cyclohexane and methanol as an overhead fraction, separating the overhead fraction from said second distillation zone into a methanol-rich phase and a cyclohexane-rich phase solely by cooling, passing said methanol-rich phase directly to said second distillation zone as at least a portion of the azeotropic agent employed therein, distilling said cyclohexane-rich phase in a third fractional distillation zone to yield at least substantially pure cyclohexane, and passing said cyclohexane directly to the first-mentioned distillation zone as a portion of the cyclohexane added to said benzene to form an azeotrope.

4. The improvement defined in claim 3 in which the azeotropic overhead distillate of the second distillation is cooled to room temperature and decanted to take overhead a solution of 90 percent to 96 percent cyclohexane with 10 percent to 4 percent methanol, and to remove a heavier solution of 62 percent to 68 percent methanol and 38 percent to 32 percent cyclohexane.

5. In a process for the purification of distilled coke-oven benzene which contains a small amount of non-aromatic hydrocarbon impurities higher boiling than benzene and substantially inseparable therefrom by simple distillation wherein a mixture of said benzene is distilled in a fractional distillation zone with added cyclohexane admixed in an amount in excess of that required to form an azeotrope with said benzene, wherein the azeotrope of benzene and said cyclohexane is removed from said distillation zone as an overhead fraction, and wherein the high boiling impurities and at least a portion of the excess cyclohexane are removed from the distillation zone as a distillation residue, the improvement which comprises distilling said azeotrope of benzene and cyclohexane in a second fractional distillation zone in the presence of an azeotropic agent comprising predominantly methanol, removing from said second distillation zone purified benzene as a distillation residue, removing from said second distillation zone the azeotrope of cyclohexane and methanol as an overhead fraction, separating the overhead fraction from said second distillation zone into a relatively light phase containing at least 90 percent methanol and a relatively dense cyclohexane-rich phase solely by cooling, passing said relatively light phase directly to said second distillation zone as at least a portion of the azeotropic agent employed therein, and passing said cyclohexane-rich phase directly to said first-mentioned distillation zone as at least a portion of the cyclohexane added to said benzene to form an azeotrope.

6. In a process for the purification of distilled coke-oven benzene which contains a small amount of non-aromatic hydrocarbon impurities higher boiling than benzene and substantially inseparable therefrom by simple distillation wherein a mixture of said benzene is distilled in a fractional distillation zone with added cyclohexane admixed in an amount in excess of that required to form an azeotrope with said benzene, wherein the azeotrope of benzene and said cyclohexane is removed from said distillation zone as an overhead fraction, and wherein the high boiling impurities and at least a portion of the excess cyclohexane are removed from the distillation zone as a distillation residue, the improvement which comprises distilling said azeotrope of benzene and cyclohexane in a second fractional distillation zone in the presence of an azeotropic agent comprising predominantly methanol, removing from said second distillation zone purified benzene as a distillation residue, removing from said second distillation zone the azeotrope of cyclohexane and methanol as an overhead fraction, separating the overhead fraction from said second distillation zone into a methanol-rich phase and a cyclohexane-rich phase in a separation zone solely by cooling, passing said methanol-rich phase directly to said second distillation zone as at least a portion of the azeotropic agent employed therein, distilling said cyclohexane-rich phase in a third fractional distillation zone to yield substantially pure cyclohexane and an azeotropic mixture of cyclohexane and methanol, passing said azeotropic mixture of cyclohexane and methanol to said separation zone, and passing said substantially pure cyclohexane to the first mentioned distillation zone as the azeotropic agent employed with said benzene.

JOHN R. ANDERSON.

REFERENCES CITED

The following references are of record in the file of this patent:

UNITED STATES PATENTS

| Number | Name | Date |
|---|---|---|
| 2,290,636 | Deanesly | July 21, 1942 |
| 2,356,240 | Hamlin | Aug. 22, 1944 |
| 2,367,701 | Tooke | Jan. 23, 1945 |
| 2,368,050 | Tooke | Jan. 23, 1945 |
| 2,440,414 | Oblad | Apr. 27, 1948 |
| 2,477,303 | Lake et al. | July 26, 1949 |

OTHER REFERENCES

Coulston et al.: "The Use of Azeotropes" etc., Journal of the Society of Chemical Industry, vol. 63, pages 329-333 (Nov. 1944).

Marschner et al.: "Hydrocarbon Azeotropes of Benzene," 38, Industrial and Engineering Chemistry, pages 262-268 (Mar. 1948).